(12) United States Patent
Kim et al.

(10) Patent No.: US 8,997,910 B2
(45) Date of Patent: Apr. 7, 2015

(54) ELECTRIC BICYCLE

(71) Applicant: Mando Corporation, Pyeongtaek-Si (KR)

(72) Inventors: Il Yong Kim, Gyeonggi-do (KR); Chang Bok Ko, Gyunggi-Do (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 18 days.

(21) Appl. No.: 13/682,611

(22) Filed: Nov. 20, 2012

(65) Prior Publication Data

US 2014/0076650 A1 Mar. 20, 2014

(30) Foreign Application Priority Data

Sep. 19, 2012 (KR) .......................... 10-2012-104087
Sep. 19, 2012 (KR) .......................... 10-2012-104088

(51) Int. Cl.
| | |
|---|---|
| *B62K 11/00* | (2006.01) |
| *B62M 6/40* | (2010.01) |
| *B62K 3/10* | (2006.01) |
| *B62K 15/00* | (2006.01) |
| *B62K 25/00* | (2006.01) |

(52) U.S. Cl.
CPC ................. *B62K 11/00* (2013.01); *B62M 6/40* (2013.01); *B62K 3/10* (2013.01); *B62K 15/006* (2013.01); *B62K 25/005* (2013.01)

(58) Field of Classification Search
CPC ............. B62M 6/55; B62M 6/40; B62M 6/00
USPC .................................. 180/205.1, 206.1, 206.4
See application file for complete search history.

(56) References Cited

U.S. PATENT DOCUMENTS

| | | | |
|---|---|---|---|
| 3,884,317 | A | 5/1975 | Kinzel |
| 6,196,347 | B1 * | 3/2001 | Chao et al. ................. 180/206.2 |

(Continued)

FOREIGN PATENT DOCUMENTS

| | | |
|---|---|---|
| EP | 2 275 330 A1 | 1/2011 |
| GB | 658966 A | 10/1951 |

(Continued)

OTHER PUBLICATIONS

Extended European Search Report issued in European Patent Application No. EP 12190196.1 dated Dec. 20, 2013.

*Primary Examiner* — Kevin Hurley
*Assistant Examiner* — Michael Stabley
(74) *Attorney, Agent, or Firm* — McDermott Will & Emery LLP (57) ABSTRACT

An electric bicycle configured to generate electricity by pedals thereof, the electric bicycle includes a front frame provided with a front wheel and a handle; a center frame provided with pedals and a saddle, a rear frame provided with a rear wheel; a pedal housing provided at the a front frame provided with a front wheel and a handle, a center frame provided with pedals and a saddle, a rear frame provided with a rear wheel, a pedal housing provided at the center frame, a pedal shaft provided with the pedals at both end portions thereof while passing through the pedal housing, an accelerating unit allowing the pedal shaft to pass therethrough and provided with an input side directly connected to the pedal shaft to increase rotational speed, and a generating unit allowing the pedal shaft to pass therethrough and directly connected to an output side of the accelerating unit.

6 Claims, 6 Drawing Sheets

(56) References Cited

U.S. PATENT DOCUMENTS

| | | | |
|---|---|---|---|
| 6,296,072 B1 * | 10/2001 | Turner | 180/220 |
| 7,273,123 B2 * | 9/2007 | Perng | 180/206.4 |
| 7,766,114 B2 * | 8/2010 | Lee et al. | 180/206.4 |
| 8,183,726 B2 * | 5/2012 | Rittenhouse | 310/68 R |
| 8,241,160 B2 | 8/2012 | Jung | |
| 8,590,655 B2 * | 11/2013 | Chan | 180/206.4 |
| 2011/0180341 A1 * | 7/2011 | Chan | 180/206.4 |
| 2012/0202649 A1 * | 8/2012 | Huber | 482/2 |

FOREIGN PATENT DOCUMENTS

| | | |
|---|---|---|
| KR | 2012-0001834 A | 1/2012 |
| WO | 2006/119531 A1 | 11/2006 |

* cited by examiner

ELECTRIC BICYCLE

CROSS-REFERENCE TO RELATED APPLICATION

This application claims the benefit of Korean Patent Applications No. 2012-0104087, filed on Sep. 19, 2012, and No. 2012-0104088, filed on Sep. 19, 2012, in the Korean Intellectual Property Office, the disclosures of which are incorporated herein by reference.

BACKGROUND

1. Field

Embodiments of the present disclosure relate to an electric bicycle, and more particularly, to an electric bicycle having no chain connecting pedals to wheels.

2. Description of the Related Art

A bicycle in general is configured to run by delivering the force that rotates the pedals of the bicycle to the wheel by use of a chain, as a human being steps on the pedals using two feet. However, the chain is provided with a complicated structure thereof while the area that the chain occupies at the bicycle is large, so the chain may be separated from the wheel, or a cloth of a rider may be stuck in the chain, and results in pollution of the clothing.

Recently, by considering such difficulties, an electric bicycle having no chain is being developed for use.

TECHNICAL PUBLICATIONS

The Korean Publication No. 10-2012-0001834 (registered on Jan. 5, 2012)

The above publication applied by the applicant is with reference to an electric bicycle having no chain. The electric bicycle includes a motor to rotate wheels, a battery to supply power to the motor, and an electronic control apparatus configured to control the motor and the battery, and when the power is supplied to the motor by the electronic control apparatus, the electric bicycle is run as the wheels are rotated by the motor.

In addition, the above publication includes a generator configured to generate electricity by the operation of pedals. That is, the electric bicycle is configured in a way that the battery is charged by using an outside outlet, or by rotating the pedals connected to the generator.

The pedals requested at the electric bicycle are needed to convert the rotational force of the pedals into electric energy in the most efficient manner, and when provided with the same efficiency, the electric bicycle is needed to be provided with a smaller size thereof.

SUMMARY

Therefore, it is an aspect of the present disclosure to provide an electric bicycle having a generator provided with a further compact size thereof and high power-generating efficiency thereof.

Additional aspects of the disclosure will be set forth in part in the description which follows and, in part, will be obvious from the description, or may be learned by practice of the disclosure.

In accordance with one aspect of the present disclosure, an electric bicycle configured to generate electricity by pedals includes a front frame, a center frame, a rear frame, a pedal housing, a pedal shaft, an accelerating unit, and a generating unit. The front frame may be provided with a front wheel and a handle. The center frame may be provided with pedals and a saddle. The rear frame may be provided with a rear wheel. The pedal housing may be provided at the center frame. The pedal shaft may be provided with the pedals at both end portions thereof while passing through the pedal housing. The accelerating unit may allow the pedal shaft to pass therethrough and have an input side directly connected to the pedal shaft to increase rotational speed. The generating unit may allow the pedal shaft to pass therethrough and directly connected to an output side of the accelerating unit.

The accelerating unit may include a sun gear, a plurality of planetary gears, a carrier, and a ring gear. The plurality of planetary gears may be configured to rotate while being teeth-coupled to an outer circumference of the sun gear. The carrier may connect central axes of the plurality of planetary gears to one another. The ring gear may be provided at an inner surface of the pedal housing and configured to be teeth-coupled to outer circumferences of the planetary gears such that the planetary gears revolve. The carrier may be directly connected to the pedal shaft, while the sun gear is directly connected to the generating unit.

The generating unit may be provided with a rotor and a stator. The pedal shaft may be configured to pass through the rotor. The sun gear may be connected to the rotor.

The accelerating unit may be provided with accelerating units of at least two stages. A sun gear of an accelerating unit, which corresponds to an input side, between the accelerating units of at least two stages may be connected to a carrier of an accelerating unit, which corresponds to an output side, between the accelerating units of at least two stages.

The accelerating units of at least two stages may be provided in series. The accelerating unit, which corresponds to the input side, between the accelerating units of at least two stages may be provided at an outside of the pedal housing.

The pedal housing may be provided with two spaces that are divided at an inside thereof, and one space of the pedal housing may be provided with the accelerating unit, while the other space of the pedal housing may be provided with the generating unit.

The pedal housing may be provided with a partition wall that divides an inside space thereof.

As described above, the pedal housing of the electric bicycle is provided at an inside thereof with a generating unit to convert the rotational energy of the pedals of the electric bicycle into electric energy, and an accelerating unit to internally increase the rotational speed of the pedals, thereby effectively achieving the compactualization of a generator at the electric bicycle.

In addition, the generating unit is separately disposed from the accelerating unit by dividing the pedal housing, thereby simplifying the structure of the electric bicycle, and furthermore, the accelerating unit is disposed in series with two stages, so that the power generating efficiency is enhanced.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Figure 1:
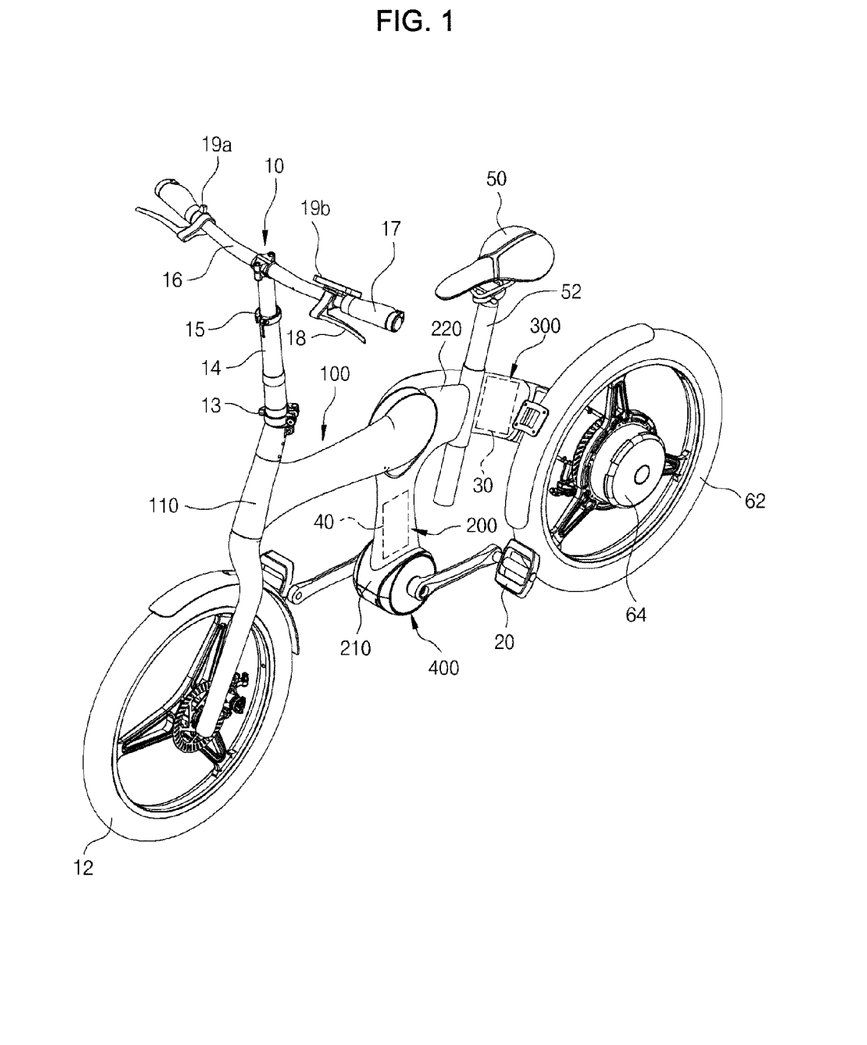
FIG. 1 is a perspective view of an electric bicycle in accordance with one embodiment of the present disclosure.

FIG. 1 is a perspective view of an electric bicycle in accordance with one embodiment of the present disclosure. Referring to FIG. 1, the electric bicycle includes a front frame 100, a center frame 200, and a rear frame 300.

The front frame 100, the center frame 200, and the rear frame 300 are axially coupled to one another at one end portion of each of the frames 100, 200 and 300 by a hinge shaft (not shown) that penetrates the each frame at the one end portion of the each frame, and are folded as the front frame 100, the center frame 200, and the rear frame 300 are rotated while having the hinge shaft as a center.

One end portion of the front frame 100 is provided with a handle tube 110, so that a handle stem 14, which is provided with a front wheel 12 and a handle unit 10, is coupled to the handle tube 110. The front wheel 12 is provided at a lower side of the handle stem 14, and the handle unit 10 configured to steer the electric bicycle is provided at an upper side of the handle stem 14. The handle unit 10 includes a handle bar 16 having the center thereof coupled to the handle stem 14, and the handle bar 16 includes a handle grip 17 as well as a brake lever 18 configured for the braking of the front wheel 12 and a rear wheel 62 provided at each end portion of the both end portions of the handle bar 16.

Here, the handle stem 14, in a case of folding the electric bicycle, enables handle unit 10 to be positioned at a side surface of the front frame 100 by using a first clamp 13, and allows the height of the handle bar 16 to be adjusted by using a second clamp 15. In addition, the handle grip 17 includes an accelerating lever 19a configured for the acceleration and the speed change of the electric bicycle, and an interface apparatus 19b configured to display the status of the bicycle to a user and to manipulate the electric bicycle through a button in a case of the request by a user. The interface apparatus 19b is electrically connected to an electronic control apparatus (not shown) configured to control electronic components such as a generator, a battery, and a motor all of which are needed for the operation of the electric bicycle.

Figure 2:
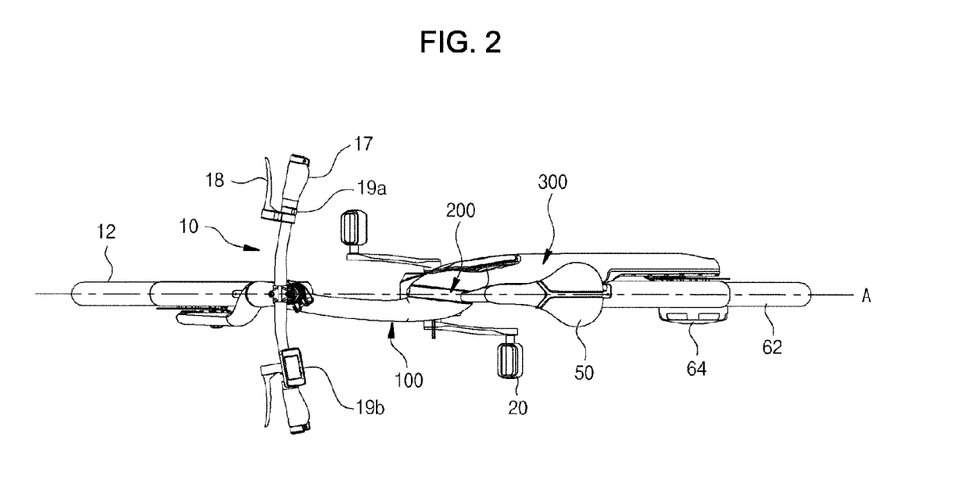
FIG. 2 is a plane view of an electric bicycle in accordance with one embodiment of the present disclosure.
Figure 3:
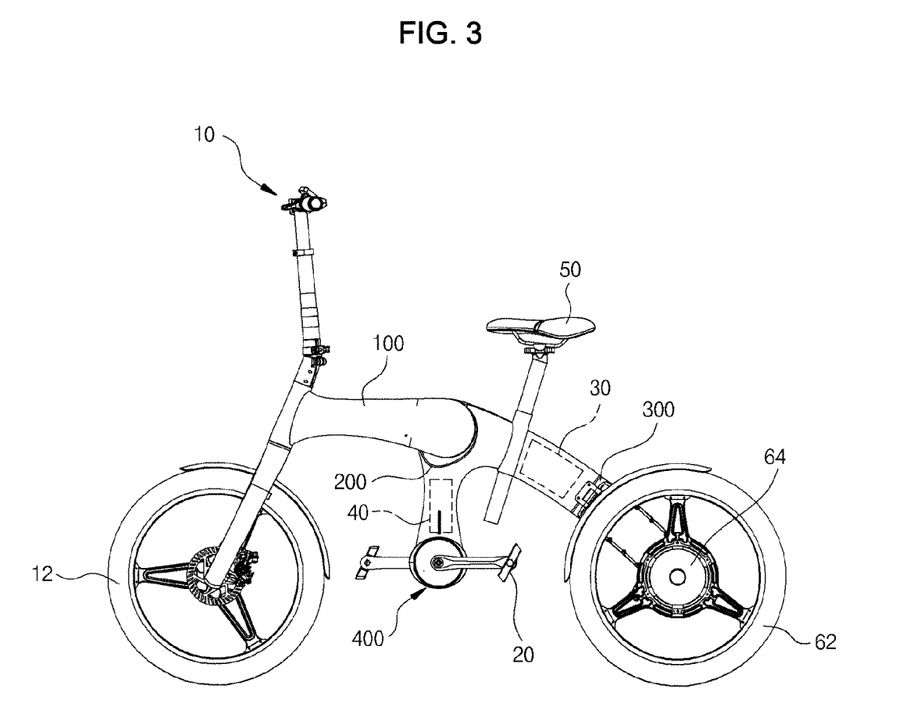
FIG. 3 is a side view of an electric bicycle in accordance with one embodiment of the present disclosure.

In addition, at a lower end portion of the handle stem 14, the front wheel 12 is rotatively coupled. At this time, as illustrated on FIG. 2, in order to have the front wheel 12 and the rear wheel 62 positioned on the same line 'A', the handle stem 14 is provided while a portion of the handle stem 14 is bent toward a side surface. Through a different method, the front wheel 12, as in a conventional bicycle, may be coupled to the handle stem 14 having a shape of a fork.

At one end portion of the center frame 200, a pedal housing 210 is provided. At the pedal housing 210, a pair of pedals 20 is rotatively provided at both sides of the pedal housing 210, and at an inside the pedal housing 210, a generator 400 and an electronic control unit (ECU) 40 are provided. The generator 400 is configured in a way that, when a user rotates the pedals 20, the rotational energy of the pedals 20 is converted to electric energy, and then the electric energy that is converted is electrically stored at a battery 30. The generator 400 will be described later.

In addition, the center frame 200, in order for a saddle 50 to be installed thereon, is provided with a saddle frame 220. The saddle frame 220 is provided at a rear side thereof with a saddle tube, on which the saddle 50 may be installed, and a saddle bar 52 configured to adjust the height of the saddle 50 is coupled to the saddle tube. The saddle frame 220 may be integrally formed with the center frame 200, or after being separately formed, may be assembled to the center frame 200 through a welding or a bolting.

The rear wheel 62 is rotatively mounted at the rear frame 300, and the rear wheel 62 moves the electric bicycle forward while being rotated by a motor 64.

In addition, the battery 30 configured to electrically store the electric energy, which is converted through the generator 400, may be built in at the rear frame 300. At this time, the battery 30 may be built in at the front frame 100, not only at the rear frame 300.

Here, in the embodiment, the generator 400 and the ECU 40 of the electric bicycle are installed at the center frame 200, and the battery 30 is installed at the rear frame 300. However, the present disclosure is not limited hereto. For example, since the each of the frames 100, 200, and 300 is provided with an accommodating space at an inside thereof, the each component may be installed at other frame other than at the frame at which the each component is presently installed.

Figure 4:
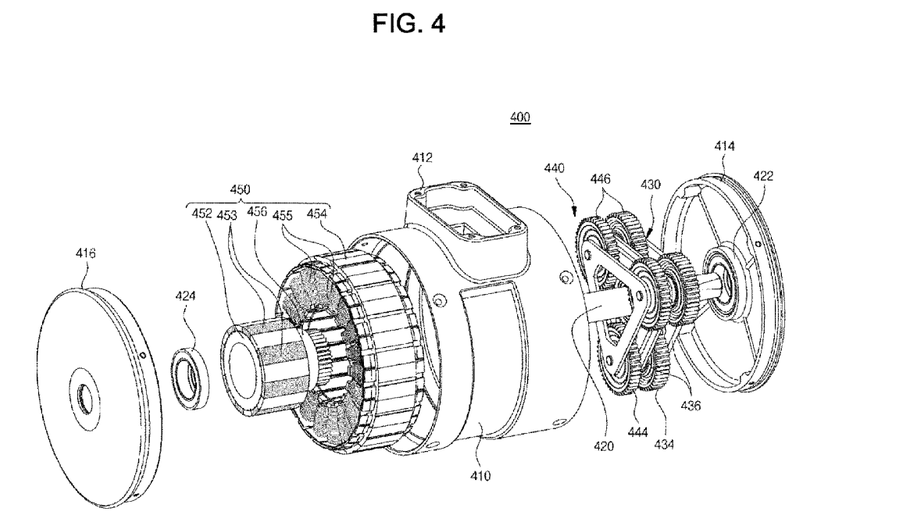
FIG. 4 is an exploded perspective view illustrating a generator of an electric bicycle in accordance with one embodiment of the present disclosure.
Figure 5:
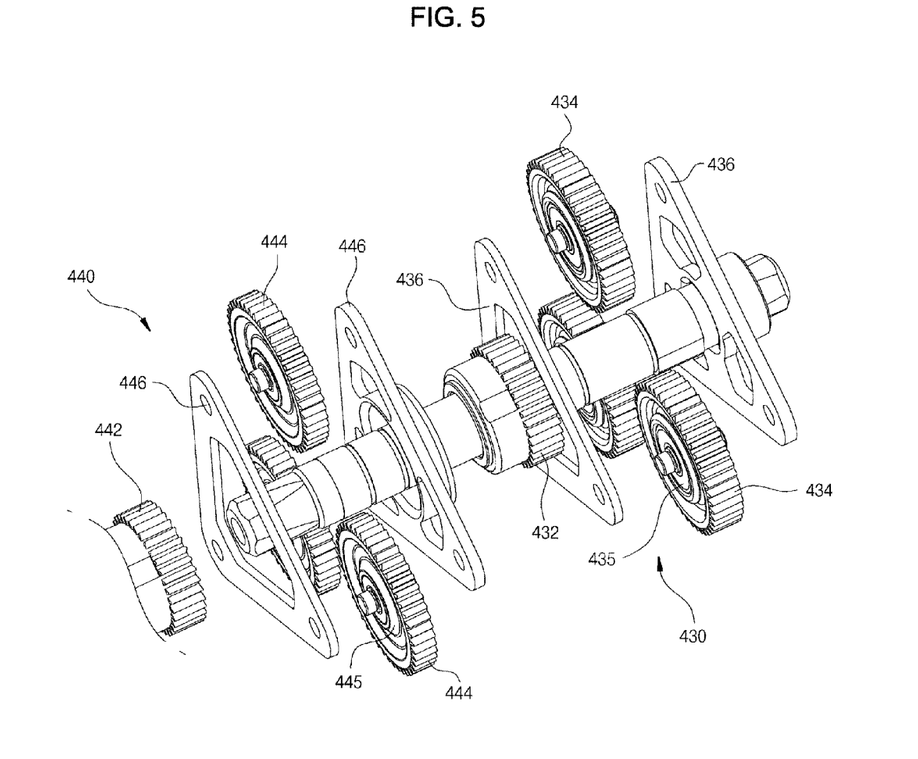
FIG. 5 is an exploded perspective view illustrating an accelerating unit of a generator of an electric bicycle in accordance with one embodiment of the present disclosure.
Figure 6:
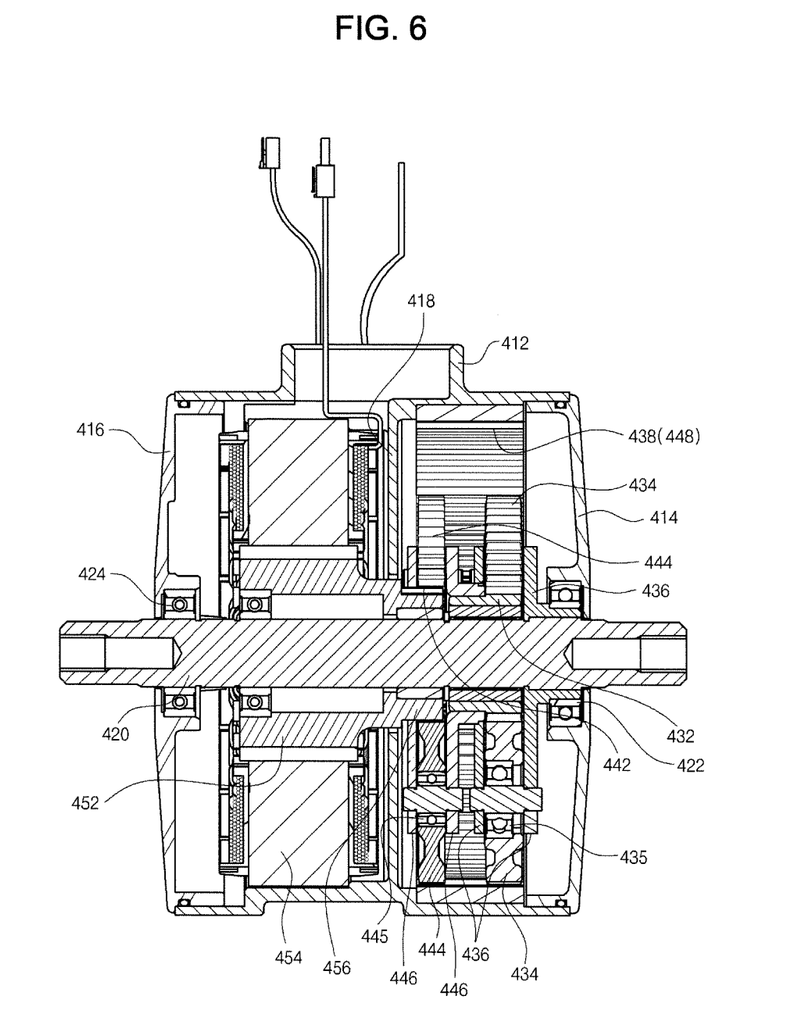
FIG. 6 is a cross-sectional view of FIG. 4.

FIG. 4 is an exploded perspective view illustrating a generator of an electric bicycle in accordance with one embodiment of the present disclosure, FIG. 5 is an exploded perspective view illustrating an accelerating unit of a generator of an electric bicycle in accordance with one embodiment of the present disclosure, and FIG. 6 is a cross-sectional view of FIG. 4.

Referring to FIG. 4, the generator 400 includes a housing 410 provided at the center frame 200, a pedal shaft 420 penetrating the housing 410 and provided with the pedals 20 at both end portions thereof, at least one accelerating unit 430 rotating in an accelerating manner while an input side thereof is connected to the pedal shaft 420, and a generating unit 450 connected to an output side of the accelerating unit 430.

The housing 410 is provided in a cylindrical shape having a hollowness at an inside thereof, and is coupled to the pedal housing 210 having an arc shape. Here, the pedal housing 210 and the housing 410, as described above, may be assembled after being separately provided, or the housing 410 may be omitted while the pedal housing 210 is provided in a cylindrical shape. A neck 412 configured to be assembled with the center frame 200 while having a rectangular shape is provided at an outer circumferential surface of the housing 410 in a protruded manner, and, housing covers 414 and 416 are coupled at hollowness portions, openings toward the left side and the right side of the housing 410, respectively.

In addition, the housing 410 is provided with a partition wall 418 at a central portion at an inside thereof to divide an inside space, so that the accelerating unit 430 and the generating unit 450 may be easily installed. The partition wall 418 maybe integrally provided with the housing 410, or may be assembled to the housing 410 after being separately provided. The partition wall 418 includes a penetrating hole through which the pedal shaft 420 penetrates, but since the penetrating hole is blocked by the generating unit 450, grease being charged into the accelerating unit 430 is not leaked to the generating unit 450.

The pedal shaft 420 penetrates the housing 410, and is provided with the pedals 20 at both end portions thereof. Bearings 422 and 424 are interposed at the housing covers 414 and 416, respectively, so that the pedal shaft 420 may be mutually rotated.

The accelerating unit 430, as illustrated on FIG. 5 in an enlarged manner, is configured to accelerate the rotational speed of the output side of the accelerating unit 430 that is supplied to the generating unit 450 when compared to the rotational speed of the input side of the accelerating unit 430 that is from the pedaling. In the embodiment, as to have a gear acceleration ratio of about 20:1, a first accelerating unit 430 and a second accelerating unit 440 are provided.

The first accelerating unit 430 includes a first sun gear 432, a plurality of first planetary gears 434 to rotate while being teeth-coupled to an outer circumference of the first sun gear 432; first carriers 436 connecting central axes of the plurality of first planetary gears 434 to one another; and a first ring gear 438 provided at an inner surface of the housing 410 in a way to be teeth-coupled to the outer circumferences of the first planetary gears 434.

At the center of the first sun gear 432, hollowness is formed so that the pedal shaft 420 is penetrated therethrough, and the first planetary gears 434 are provided in sets while the each set is provided with three first planetary gears. The central axes of the three first planetary gears 434 are inserted into bearings 435, and are connected to the first carriers 436, each having a shape of a plate.

The second accelerating unit 440 includes a second sun gear 442, a plurality of planetary gears 444 to rotate while being teeth-coupled to an outer circumference of the second sun gear 442; second carriers 446 connecting the central axes of the plurality of second planetary gears 444; and a second ring gear 448 provided at an inner surface of the housing 410 in a way to be teeth-coupled to the outer circumferences of the second planetary gears 444. The second ring gear 448 may be implemented by extending the first ring gear 438.

At the center of the second sun gear 442, hollowness is formed so that the pedal shaft 420 is penetrated therethrough, and the second planetary gears 444 are provided in sets while the each set is provided with three second planetary gears. The central axes of the three second planetary gears 444 are inserted into bearings 445, and are connected to the second carriers 446, each having a shape of a plate.

The first accelerating unit 430 and the second accelerating unit 440 are connected in series. As to have the accelerating units 430 and 440 easily assembled with the generating unit 450, the first accelerating unit 430, which corresponds to an input side, is provided at an outside of the housing 410 to be directly connected to the pedal shaft 420, while the second accelerating unit 450, which corresponds to an output side, is provided at an inside of the housing 410 to be directly connected to the generating unit 450. If a larger acceleration is desired, a plurality of generating units including a third generating unit to an $n^{th}$ accelerating unit may be added and consecutively disposed in series.

With respect to the first accelerating unit 430, for the acceleration of the rotational speed, the first carriers 436 corresponds to an input side of the first accelerating unit 430, and the first sun gear 432 corresponds to an output side of the first accelerating unit 430. That is, when the first carriers 436 of the first accelerating unit 430 are rotated, the first planetary gears 434 revolve and rotate along the first ring gears 438, and accordingly, the first sun gear 432 that is tooth-coupled with the first planetary gears 434 is rotated at an increased speed.

The first sun gear 432 is directly connected to the second carriers 446 of the second accelerating unit 440. When the second carriers 446 are rotated, the second planetary gears 444 revolve and rotate along the second ring gears 448, and accordingly, the second sun gear 442 that is tooth-coupled with the second planetary gears 444 is rotated at an increased speed.

The second sun gear 442 is connected to the generating unit 450.

The generating unit 450 includes a rotor 452 provided at a central portion of the generating unit 450, as well as a stator 454 configured to electromagnetically interacting with the rotor 452. The rotor 452 includes a plurality of permanent magnets 453 at an outer circumferential surface thereof, and the stator 454 includes a number of coils 455 that are wound. The composition of the generating unit 450 configured to generate electricity by the rotational force is a general one, and thus the detailed description will be omitted.

The rotor 452 includes hollowness at an inside thereof, so that the pedal shaft 420 is penetrated therethrough, because while the pedal shaft 420 is directly connected to an input side of the first accelerating unit 430, the rotor 452 is mutually rotated while being directly connected to an output side of the second accelerating unit 440. For the mutual rotation, the rotor 452 and the pedal shaft 420 may interpose bearings thereinbetween, or may be disposed while spaced apart from each other by having the hollowness thereinbetween.

In addition, the rotor 452 includes a rotor shaft 456 extendedly provided in lengthways of the pedal shaft 420. The rotor shaft 456 is directly connected to the second sun gear 442 of the second accelerating unit 440. In addition, the rotor shaft 456 is rotatively coupled to the penetrating hole of the partition wall 418 to prevent the grease at an inside the accelerating units 430 and 440 from being introduced to the generating unit 450.

Then, by referring to FIG. 6, the motion of the generator of the electric bicycle having the structure as the above will be described.

When a user steps on the pedals 20 to rotate, the pedal shaft 420, first, rotates the first carriers 436 of the first accelerating unit 430. As the first carriers 436 are rotated, the first planetary gears 434 are revolved and rotated along the first ring gear 438, and as a result, the first sun gear 432 tooth-coupled with the first planetary gears 434 is rotated. Through the process as such, the rotational speed of the pedals 20 is primarily accelerated.

Then, the first sun gear 432 of the first accelerating unit 430 rotates the second carriers 446 of the second accelerating unit 440. As the second carriers 446 are rotated, the second planetary gears 444 is revolved and rotated along the second ring gear 448, and as a result, the second sun gear 442 tooth-coupled with the second planetary gears 444 is rotated. Through the process as such, the rotational speed of the pedals 20 is secondarily accelerated.

Next, the second sun gear 442 rotates the rotor 452 of the generating unit 450, and the electric energy generated by the electromagnetic interaction of the rotor 452 and the stator 454 is electrically stored at the battery 30. The electric energy stored at the battery 30 is controlled by the ECU 40, and drives a motor 54, so that the electric bicycle is moved forward.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A chainless electric bicycle configured to generate electricity by pedals, the chainless electric bicycle comprising:
    a front frame provided with a front wheel and a handle;
    a center frame provided with pedals and a saddle;
    a rear frame provided with a rear wheel;
    a pedal housing provided at the center frame;
    a pedal shaft provided with the pedals at both end portions thereof while passing through the pedal housing;
    an accelerating unit allowing the pedal shaft to pass therethrough and having an input side directly connected to the pedal shaft to increase rotational speed; and
    a generating unit allowing the pedal shaft to pass therethrough and directly connected to an output side of the accelerating unit,
    wherein the pedal housing is provided with a partition wall that divides an inside space thereof, and
    the partition wall includes a penetrating center hole through which the generating unit passes in order to be connected to the accelerating unit.

2. The chainless electric bicycle of claim 1, wherein the accelerating unit comprises:
    a sun gear;
    a plurality of planetary gears to rotate while being teeth-coupled to an outer circumference of the sun gear;
    a carrier connecting central axes of the plurality of planetary gears to one another; and
    a ring gear provided at an inner surface of the pedal housing and configured to be teeth-coupled to outer circumferences of the planetary gears such that the planetary gears revolve, and the carrier is directly connected to the pedal shaft, while the sun gear is directly connected to the generating unit.

3. The chainless electric bicycle of claim 2, wherein:
    the generating unit is provided with a rotor and a stator;
    the pedal shaft is configured to pass through the rotor; and
    the sun gear is connected to the rotor.

4. The chainless electric bicycle of claim 2, wherein the accelerating unit is provided with accelerating units of at least two stages,
    and a sun gear of an accelerating unit, which corresponds to an input side, between the accelerating units of at least two stages is connected to a carrier of another accelerating unit, which corresponds to an output side, between the accelerating units of at least two stages.

5. The chainless electric bicycle of claim 4, wherein the accelerating units of at least two stages are provided in series, and
    the accelerating unit, which corresponds to the input side, between the accelerating units of at least two stages is provided at an outside of the pedal housing.

6. The chainless electric bicycle of claim 1, wherein the pedal housing is provided with two spaces that are divided at an inside thereof, and one space of the pedal housing is provided with the accelerating unit, while the other space of the pedal housing is provided with the generating unit.

* * * * *